United States Patent
Krobok et al.

(10) Patent No.: US 7,637,569 B2
(45) Date of Patent: Dec. 29, 2009

(54) DEVICE FOR CONDUCTING AIR IN ORDER TO PROVIDE AIR CONDITIONING FOR A BODY SUPPORT DEVICE

(75) Inventors: Martin Krobok, Aichach (DE); Markus Köpferr, Mönchsroth (DE)

(73) Assignee: W.E.T. Automotive Systems AG, Odelzhausen (DE)

( * ) Notice: Subject to any disclaimer, the term of this patent is extended or adjusted under 35 U.S.C. 154(b) by 0 days.

(21) Appl. No.: 11/813,891

(22) PCT Filed: Jan. 3, 2006

(86) PCT No.: PCT/DE2006/000003

§ 371 (c)(1),
(2), (4) Date: Jul. 13, 2007

(87) PCT Pub. No.: WO2006/076878

PCT Pub. Date: Jul. 27, 2006

(65) Prior Publication Data

US 2008/0129089 A1    Jun. 5, 2008

(30) Foreign Application Priority Data

Jan. 18, 2005    (DE) ..................... 10 2005 002 416

(51) Int. Cl.
*A47C 7/02* (2006.01)

(52) U.S. Cl. .............. 297/284.2; 297/284.3; 297/284.4; 297/284.5; 297/180.1; 297/180.14

(58) Field of Classification Search ............. 297/180.1, 297/180.11, 180.12, 180.14, 284.2, 284.3, 297/284.4, 284.5
See application file for complete search history.

(56) References Cited

U.S. PATENT DOCUMENTS 3,326,601 A  *  6/1967  Parkinson et al. ........ 297/284.6

(Continued)

FOREIGN PATENT DOCUMENTS

EP    0345806 A    12/1989

(Continued)

OTHER PUBLICATIONS

International Search report, International Application No. PCT/DE2006/000003, dated Apr. 26, 2006, published as WO2006/076878.

*Primary Examiner*—Laurie K Cranmer
(74) *Attorney, Agent, or Firm*—Dobrusin & Thennisch PC

(57) ABSTRACT

A device for guiding air for air conditioning a body support device, that may include a carrier layer including a contact surface and a opposing surface; a heating conductor disposed upon the contact surface; an air guiding layer including an air-impermeable wall, wherein the air guiding layer is disposed on the opposing surface of the carrier layer; an air-feeding device connectively disposed to the air guiding layer or the air-impermeable wall; and at least one adjusting device including a bladder with a bladder wall, wherein at least a portion of the bladder wall is formed by the air-impermeable wall of the air guiding layer.

5 Claims, 2 Drawing Sheets

U.S. PATENT DOCUMENTS

Figure 1:
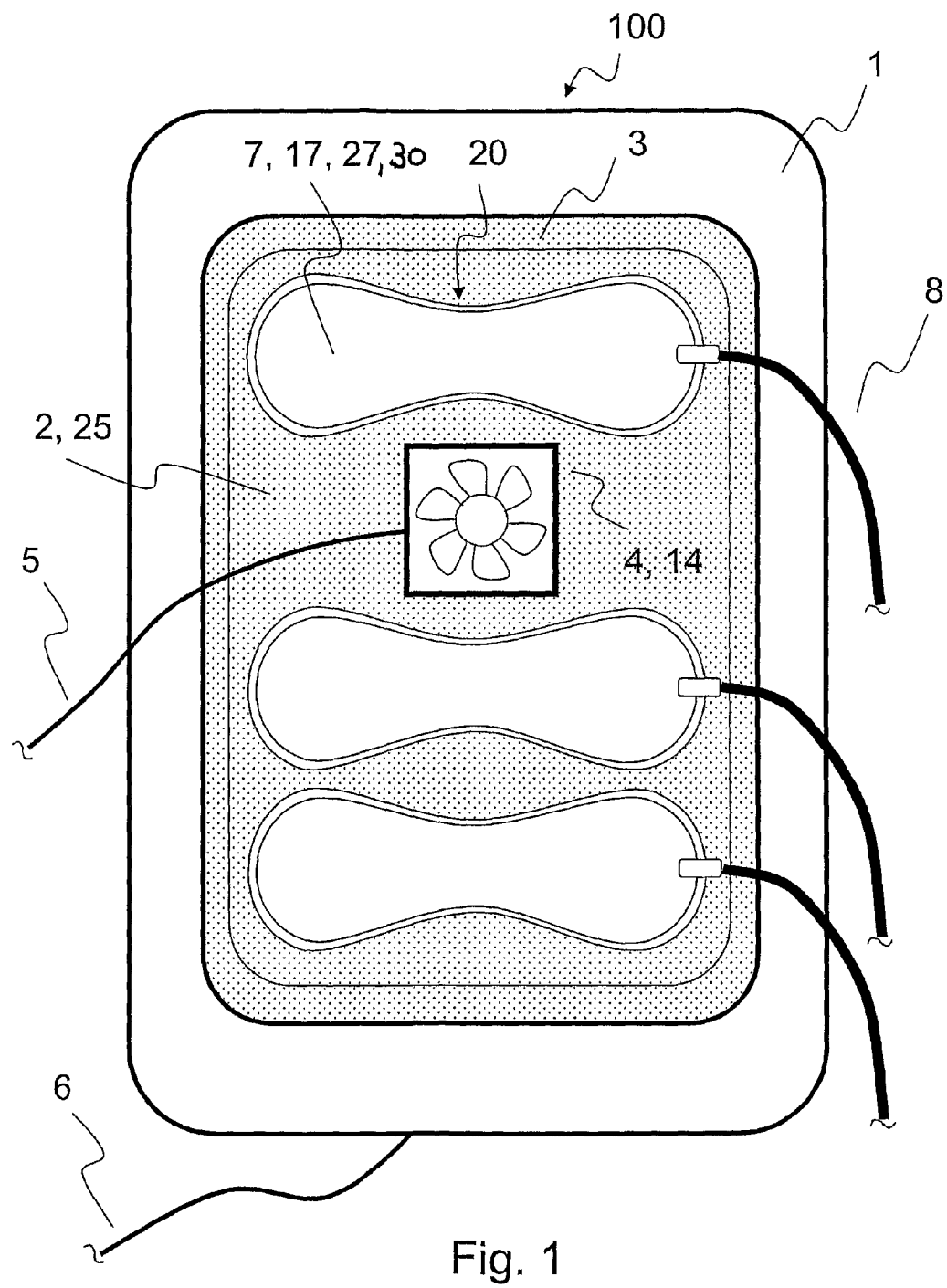

| | | | |
|---|---|---|---|
| 4,175,297 A * | 11/1979 | Robbins et al. | 5/284 |
| 5,035,016 A * | 7/1991 | Mori et al. | 5/713 |
| 5,171,209 A * | 12/1992 | Gamba | 602/13 |
| 5,190,348 A * | 3/1993 | Colasanti | 297/284.6 |
| 6,823,549 B1 * | 11/2004 | Hampton et al. | 5/713 |
| 7,210,176 B2 * | 5/2007 | Weedling et al. | 5/81.1 R |
| 2004/0245811 A1 * | 12/2004 | Bevan et al. | 297/180.12 |
| 2006/0138810 A1 * | 6/2006 | Knoll et al. | 297/180.1 |
| 2007/0262621 A1 * | 11/2007 | Dong et al. | 297/180.12 |
| 2007/0296251 A1 | 12/2007 | Krobok et al. | |

FOREIGN PATENT DOCUMENTS

| | | |
|---|---|---|
| EP | 1447070 A | 8/2004 |
| WO | 01/00132 A | 1/2001 |
| WO | 2006/076878 A1 | 7/2006 |

* cited by examiner

US 7,637,569 B2

DEVICE FOR CONDUCTING AIR IN ORDER TO PROVIDE AIR CONDITIONING FOR A BODY SUPPORT DEVICE

CLAIM OF PRIORITY

The present application claims the benefit of the priority of the filing date of PCT Application Ser. No. PCT/DE2006/000003 filed Jan. 3, 2006 and German Application Ser. No. DE102005002416 filed Jan. 18, 2005, which is herein incorporated by reference for all purposes.

BACKGROUND SECTION

State of the Art

Air conditioning devices for vehicle seats are known. Pneumatic seat adjusters for lumbar support and massage systems for seats are also known. Integrating both systems into a seat is problematic. If a seat adjuster is positioned under a seat cushion, large volumes must be moved in order to notice an effect at the seat surface. This leads to overdimensioned pumps and low adjustment speeds. Conversely, the air conditioning function is impaired when the adjustment elements are positioned on the sitting surface.

SUMMARY OF THE INVENTION

The present invention relates to a device for guiding air according to the preamble of Claim 1. Devices according to the class are used, e.g., for air conditioning vehicle seats.

Accordingly, pursuant to one aspect of the present invention, there is contemplated a device (100) for guiding air for air conditioning a body support device, especially in a vehicle seat, characterized in that the device (100) is also provided with at least one adjusting device (7) for adjusting at least one contact zone (20) of the body support device contacted by a user.

The invention may be further characterized by one or any combination of the features described herein, such as the adjusting device (7) has at least one essentially fluid tight volume body (27) whose volume can be adjusted by regulating its fluid content through fluid supply or discharge, especially in that the volume body (27) is constructed as an essentially air tight bladder (17) whose size is pneumatically adjustable; the device (100) has, for guiding an air stream within the device (100), at least one wall (25) that is at least partially impermeable to air, and in that this wall (25) is at least partially a component of the adjusting device (9); the volume body (27), especially the bladder (17), is formed at least partially from the wall (25), which at least partially covers an air guiding layer (2) that can carry an air flow and which is preferably formed from a polyurethane film; the device (100) is constructed together with the adjusting device (7) as a modular system, especially as a coherent module, especially as a functional mat for insertion into a foam body of a cushion part of the body support device or as a support mat for placement on the completed body support device; the fluid lines (8) used for setting the adjusting device (7) are arranged within the device (100), especially within the air guiding layer (2); the device (100) and the adjusting device (7) have additional components, which are used simultaneously for the air conditioning function and the adjustment of the contact zone (20), especially a common electrical and/or electronic control and/or attachment means.

OBJECT OF THE INVENTION

One object of the invention is a device with the features of Claim 1. This has the advantage that through the integration of a seat adjuster into an air conditioning device, mutual interference between the two systems is avoided.

Other advantageous constructions can be taken from the subordinate claims.

DRAWING FIGURES

Figure 2:
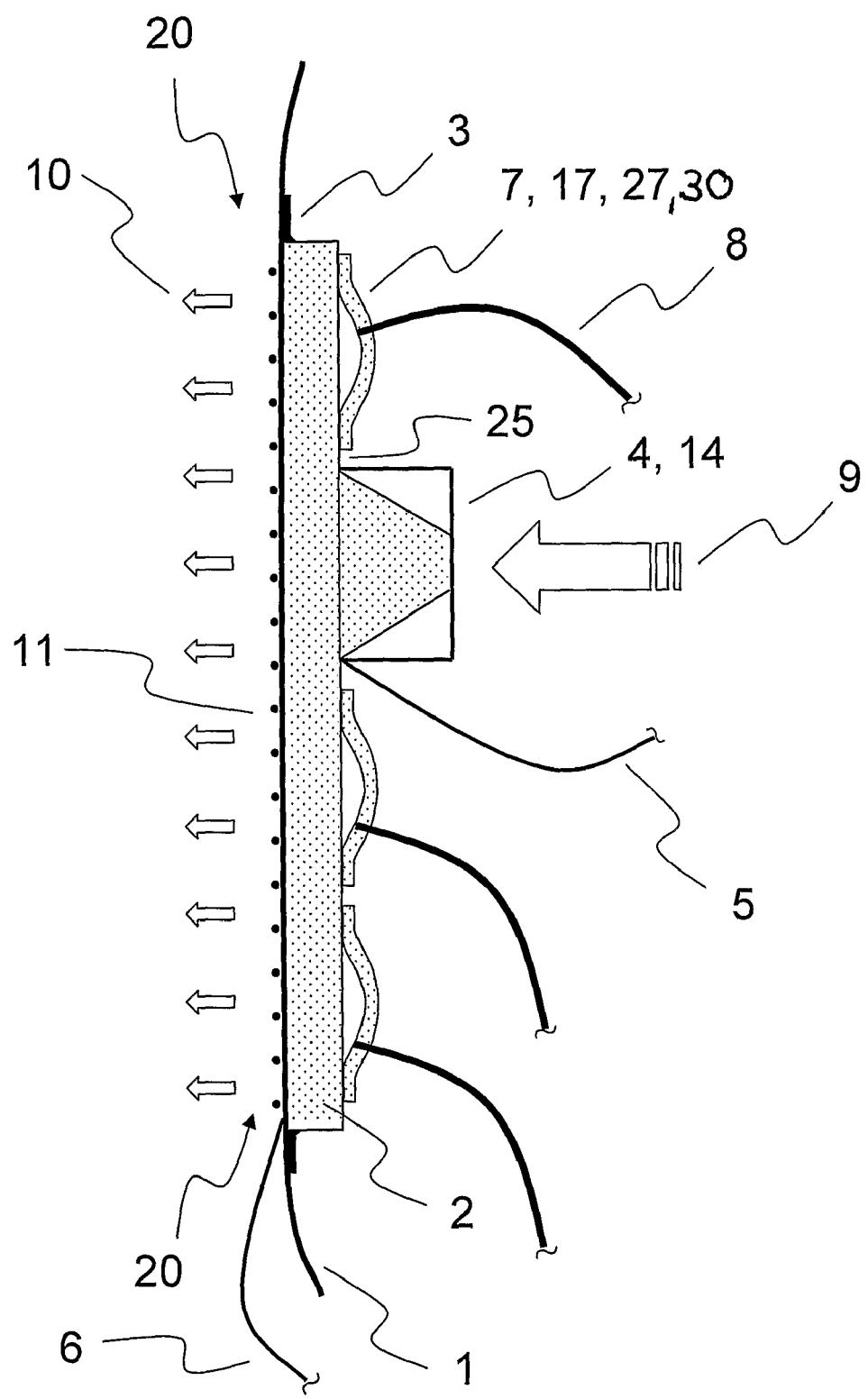

The following description deals with possibilities for configuration of the invention. These designs are to be understood as only examples, and reference is made to:

FIG. 1, top view of an air conditioning device with adjuster
FIG. 2, longitudinal section through the arrangement of FIG. 1

DETAILED DESCRIPTION OF THE INVENTION

A body support device is understood below to include, in particular, any furniture for sitting and/or resting and all devices offering support to a person while standing, sitting, or lying down in vehicles.

FIGS. 1 and 2 show a functional module according to the invention. A device 100 for guiding air for air conditioning a body support device has a carrier layer 1. This is manufactured from an air permeable material. In the embodiment, it is formed at least partially by a non woven material. It is designed for overlay on a foam core of a cushion, especially of a vehicle seat.

On the side of the carrier layer 1 facing a contact zone 20 and a user there are heating conductors 11 of an electrical heating element. They are arranged essentially over the entire surface of the carrier layer 1. They can be produced from metal and/or from electrically conductive plastics, e.g., carbon.

An air guiding layer 2 is arranged on the side of the carrier layer 1 facing away from the contact surface 20. The air guiding layer 2 can be formed, e.g., from a spacing fabric. In the present example, it is formed from a plurality of spirals extending longitudinally in the guide layer. It has a sufficient cross section of, e.g., one centimeter, to provide a sufficient amount of air to the contact surface 20. The dimensions of its basic surface are somewhat smaller than that of the carrier layer 1. It is therefore guaranteed that when the air guiding layer 1 is inserted into a corresponding recess of a seat cushion, there is no detectable unevenness at the edges.

The air guiding layer 2 is essentially completely covered by a wall 25. This is formed in the embodiment from a polyurethane film that is not permeable to air. The wall 25 essentially completely covers the air guiding layer 2. It is connected—in the embodiment, adhered—to the carrier layer in its edge region.

The wall 25 has a recess connected to an air feeding device 4. This air feeding device 4 is formed in the present embodiment by a fan 14, which is fixed indirectly or directly to the air guiding layer 2 and/or to the wall 25. It can also be formed, however, by a tube or a snorkel like extension of the wall 25, which is connected, e.g., to a distant fan or an on board air conditioning system.

At least one adjusting device 7 is provided on the wall 25. This adjusting device 7 has a volume body 27 whose volume is variable. In the present example, the volume body 27 is formed from a bladder 17. This bladder 17 is preferably formed from material that is not permeable to air. In the present embodiment, the bladder is also formed from polyurethane film. A part of the bladder wall 30 is here formed by the wall 25 of the air guiding layer 2.

The volume body 27 preferably has an elongated construction and runs perpendicular to the expected position of the spinal column of a user. It is preferably constructed thicker at its ends. In the area of its center, in the vicinity of the spinal column, it has a narrower construction. The volume body 27 is connected to a fluid supply device and/or an outlet valve via a fluid line 8.

For the shown case that several volume bodies 27 are provided, a plurality of fluid lines 8 is also required if the volume body 27 is to be individually adjustable. Because the fan 14 also requires an electric supply line 5, it is preferable to guide the fluid lines 8 and the supply line 5 within the air guiding layer 2. In order to not interfere with the air distributing function of the air guiding layer 2, it is preferable to guide it along the edge of the air guiding layer 2.

During operation, an air stream 9 is blown into the air guiding layer 2 via the fan 14 for air conditioning. There it is distributed along the carrier layer 1, and is then blown out through this layer and through the heating element to the user.

For adjusting the seat contours according to the desires of the user and/or for massaging, the bladders 17 are filled via the fluid lines 8 with a corresponding amount of fluid. In this way, the bladder 17 expands or contracts accordingly. Thus, the contact zone 20 is positioned or moved accordingly.

The invention claimed is:

1. A device for guiding air for air conditioning a body support device, comprising:

a carrier layer including a contact surface and a opposing surface;

an air guiding layer including an air-impermeable wall, wherein the air guiding layer is disposed on the opposing surface of the carrier layer;

an air-feeding device connectively disposed on the air guiding layer or the air-impermeable wall; and at least one adjusting device including a bladder with a bladder wall, wherein at least a portion of the bladder wall is integrally formed using a portion of the air-impermeable wall of the air guiding layer.

2. The device of claim 1, wherein the at least one adjusting device includes at least one essentially fluid-tight volume body whose volume can be adjusted by regulating its fluid content through fluid supply or discharge, wherein the volume body is constructed as an essentially air-tight bladder whose size is pneumatically adjustable.

3. The device of claim 1, wherein the air-impermeable wall is formed from a polyurethane film.

4. The device of claim 1, wherein the device is constructed together with the at least one adjusting device as a coherent modular system and functional mat for insertion into a foam body of a cushion part of the body support device or as a support mat for placement on the completed body support device.

5. The device of claim 1, including at least a second adjusting device and at least two fluid lines in fluid communication with the adjusting devices such that each adjusting device is individually adjustable.

* * * * *